United States Patent

Tsunetomo et al.

Patent Number: 6,008,467
Date of Patent: Dec. 28, 1999

[54] LASER PROCESSING METHOD TO AN OPTICAL WAVEGUIDE

[75] Inventors: Keiji Tsunetomo; Tadashi Koyama, both of Osaka, Japan

[73] Assignee: Nippon Sheet Glass Co., Ltd., Osaka, Japan

[21] Appl. No.: 08/943,488

[22] Filed: Oct. 3, 1997

[30] Foreign Application Priority Data

Oct. 24, 1996 [JP] Japan .................................. 8-282363

[51] Int. Cl.$^6$ .................................................. B23K 26/00
[52] U.S. Cl. ........................... 219/121.69; 219/121.71; 219/121.85; 264/1.27; 264/1.37; 264/400
[58] Field of Search .................... 219/121.69, 121.71, 219/121.85, 121.61; 65/392; 264/1.25, 1.27, 1.37, 400

[56] References Cited

U.S. PATENT DOCUMENTS

| | | | |
|---|---|---|---|
| 4,147,402 | 4/1979 | Chown | 219/121.69 X |
| 4,598,039 | 7/1986 | Fischer et al. | 219/121.69 X |
| 5,393,371 | 2/1995 | Chang et al. | 219/121.85 X |

FOREIGN PATENT DOCUMENTS

| | | |
|---|---|---|
| 2-33105 | 2/1990 | Japan . |
| 5-11134 | 1/1993 | Japan . |
| 5-333232 | 12/1993 | Japan . |
| 7-244222 | 9/1995 | Japan . |
| 7-248428 | 9/1995 | Japan . |

*Primary Examiner*—Gregory Mills
*Attorney, Agent, or Firm*—Merchant & Gould P.C.

[57] ABSTRACT

In a method for forming a hole for fitting an optical fiber only at a core portion without having to precisely match or accord the focus of a laser beam with the end surface of an optical waveguide, when a laser beam is irradiated onto the end surface of the optical waveguide, the focus of the laser beam is turned away from the end surface of the optical waveguide and a region of the irradiation includes the core and the periphery thereof. Thereafter, the energy of the laser beam is increased step by step, and a few pulses thereof are radiated with the intensity fixed when ablation occurs at the core portion, so that the hole is formed only at the core portion.

5 Claims, 4 Drawing Sheets

LASER PROCESSING METHOD TO AN OPTICAL WAVEGUIDE

BACKGROUND OF THE INVENTION

1. Field of the Invention

The present invention relates to a method for forming a hole for fitting for example, an optical fiber at a core of an optical waveguide by a laser beam.

2. Description of Related Art

Optical communication can transmit a mass of information at high speed. Therefore, it is used in various fields as basic circuits for telephone communications, LAN (local-area network) circuits, data communications between devices, or the like. An optical fiber is a medium of transmitting signals in optical communications, and the networking (branching and joining together) of light beams occurs through combining the optical fiber with an optical waveguide.

For effectively introducing a light beam into an optical fiber via an optical waveguide or for effectively introducing a light beam from an optical fiber into an optical waveguide, it is necessary that the core of the optical fiber and that of the optical waveguide be precisely matched, or accorded.

However, though the diameter of the core of the optical fiber depends on the kind thereof, it is a few or several $\mu m$ in the case of a single mode optical fiber of quartz, for example. Therefore, a stage device which moves with a very fine accuracy and a relative long time is necessitated for adjusting the core onto the core of an optical waveguide.

Then, in the prior art, methods for adjusting the core of an optical fiber and that of an optical waveguide by using convexo-concave insertion are already known, as disclosed for example, in Japanese Laid-open Patent Nos. Hei 5-11134 (1993) and Hei 2-33105 (1990). Further, methods for forming a hole for fitting the core of an optical fiber at a focus position are disclosed in Japanese Laid-open Patent Nos. Hei 7-244222 (1995) and Hei 7-248428 (1995).

In the disclosure of Japanese Laid-open Patent No. Hei 5-11134 (1993), a hole for fitting is formed at the core portion of an optical waveguide with a micro drill, a micro end mill and an electrodeposition sharpening stone.

In the disclosure of Japanese Laid-open Patent Nos. Hei 7-244222 (1995) and Hei 7-248428 (1995), a concavity is formed through pressing a heated conic diamond pressure member to the end surface of a lens and a convexity which is formed at the point surface of an optical fiber is fitted into the above concavity.

In the disclosure of Japanese Laid-open Patent No. Hei 2-33105 (1990), by transmitting a monitor beam incident into the core layer from one end surface of the core layer of an optical waveguide and by referencing the monitor beam emitted from the other end surface of an optical waveguide, a $CO_2$ laser is superposed on the monitor beam so as to form a concavity for inserting an optical fiber into the core portion.

All of the methods disclosed in Japanese Laid-open Patent Nos. Hei 5-11134 (1993), Hei 7-244222 (1995) or Hei 7-248428 (1995) are not suitable for mass production since they require fine machining processes.

In the method which uses a laser beam, as disclosed in Japanese Laid-open Patent No. Hei 2-33105 (1990), it is necessary to ascertain a focus position by referencing a monitor beam and to process by finely adjusting the position of an optical waveguide on the stage device by very fine movements etc. Therefore, it takes a long period of time, resulting in a poor yield.

SUMMARY OF THE INVENTION

According to the present invention, for resolving such drawbacks mentioned above, there is provided a laser processing method to an optical waveguide, comprising the steps of: forming a highly refractive core in which a light beam is to be transmitted in a substrate as an optical waveguide; making absorption characteristics of the core with respect to a laser beam superior in proportion to a refractive index of the core; radiating the laser beam onto a region which has the highly refractive core at one end surface of the optical waveguide, wherein an intensity of the laser beam is set at a value more than a threshold value that is enough to cause fusion, evaporation or ablation to the core and less than to other portions of the region; so that a hole is formed only at the core portion of the region.

For achieving the above processing, it is necessary that the absorption characteristics of the core with respect to the laser beam vary in proportion to the refractive index. Also, it is necessary that silver be introduced into the core portion in the form of, for example, Ag atoms, Ag colloids or Ag ions.

By providing the portion which has good absorption characteristics with respect to the laser beam, it becomes possible to also use an excimer laser including an XeF laser; an Nd:YAG laser; a Ti:$Al_2O_3$ laser and a harmonic thereof and a light beam which is converted with respect to the wavelength thereof; or, a pigment laser; although, conventionally, a laser beam which can form a hole through irradiating onto glass has been limited to an excimer laser including an ArF laser operating at a wavelength 193 nm, or a $CO_2$ laser.

The above laser beams can easily form a hole only at the core portion as a result of having a low absorption index thereof with respect to the substrate which comprises the optical waveguide.

DESCRIPTION OF THE PREFERRED EMBODIMENTS

Hereinafter, detailed explanation of the embodiments according to the present invention will be given by referring to the attached drawings.

Figure 1:
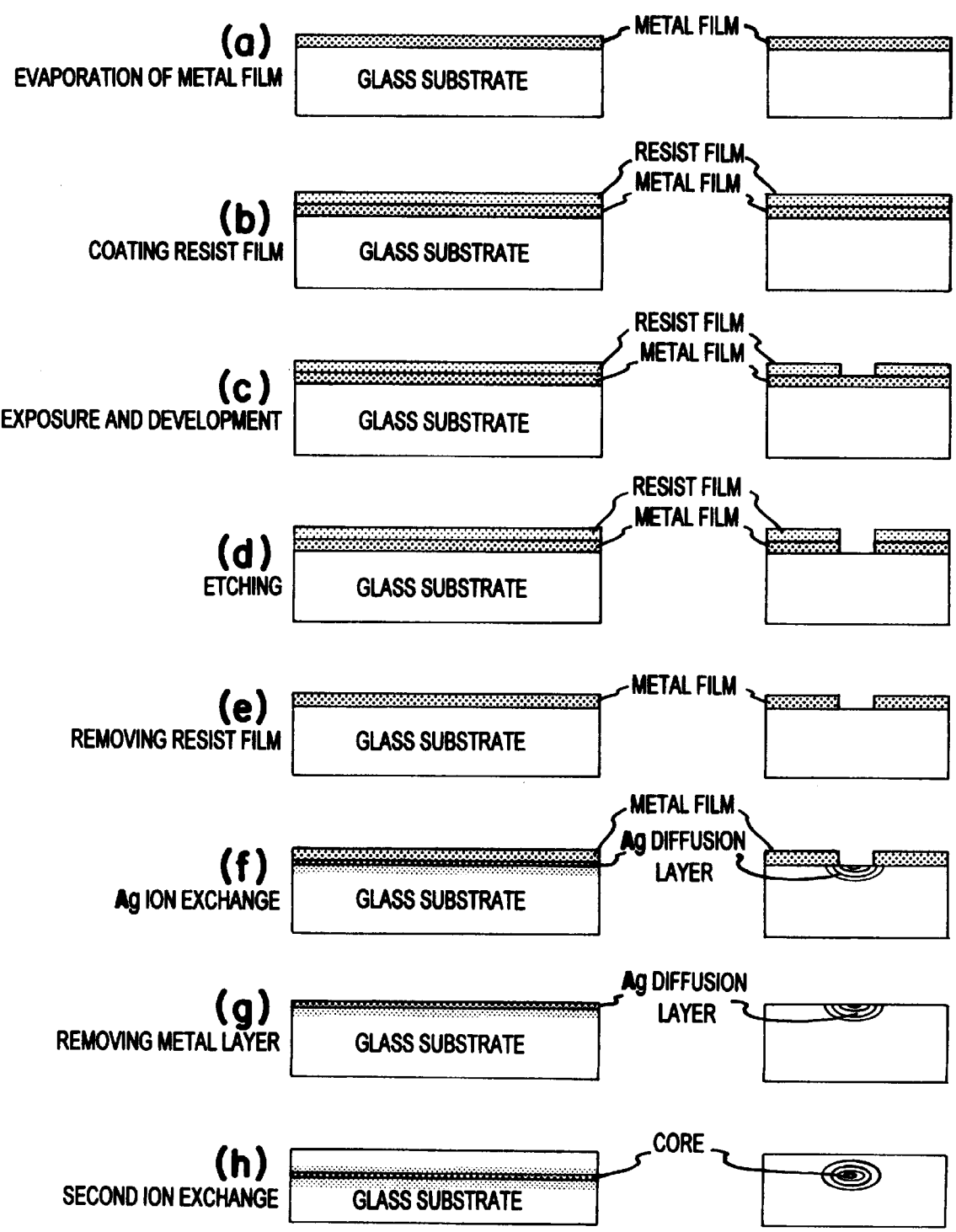
FIGS. 1(*a*) through (*h*) are drawings for explaining the process of forming the core portion at the glass substrate which becomes the optical waveguide.

As shown in FIG. 1(*a*), a metal film is formed on a surface of a glass substrate which is mostly made of $SiO_2$—$B_2O_3$—$Al_2O_3$—$Na_2O$, by evaporation. As shown in FIG. 1(*b*), a resist film is coated on the metal film. As shown in FIG. 1(*c*), the resist film is treated with exposure and development processes by photolithography and a waveguide pattern is formed. As shown in FIG. 1(d), by etching the metal film via the resist film, a waveguide pattern is formed on the metal film. Further, as shown in FIG. 1(e), the resist film is removed and only the metal film is left on the surface of the glass substrate.

Figure 2:
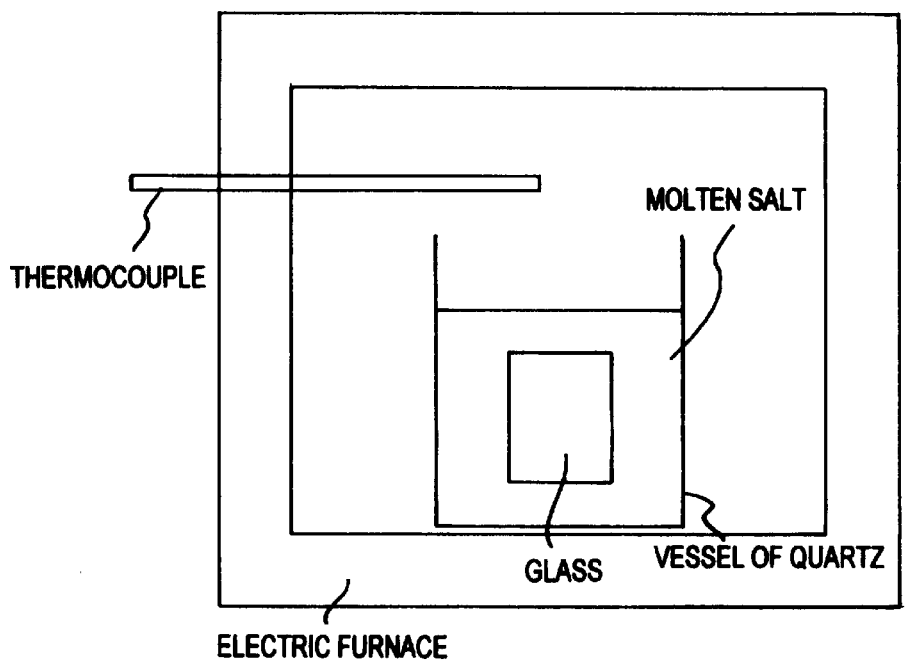
FIG. 2 is a schematic diagram of an apparatus for the first ion exchange.

The first ion exchange is carried out on the glass substrate with an ion exchange apparatus shown in FIG. 2. In the ion exchange apparatus, a vessel of quartz is filled with molten salt which is a mixture of silver nitrate and sodium nitrate mixed at 50 mol %—50 mol %, and the above glass substrate is dipped for 12 minutes in the molten salt, the temperature of which is kept at 300° C. by means of an electric furnace. Then, Na ions (a positive ion of a monovalent) on the surface of the glass substrate are eluted, and as shown in FIG. 1(f), Ag ions in the molten salt are diffused into the glass substrate. The thickness of the layer, into which the Ag ions are diffused, is measured by an X-ray micro analyzer and is found to be about 3 $\mu$m.

Figure 3:
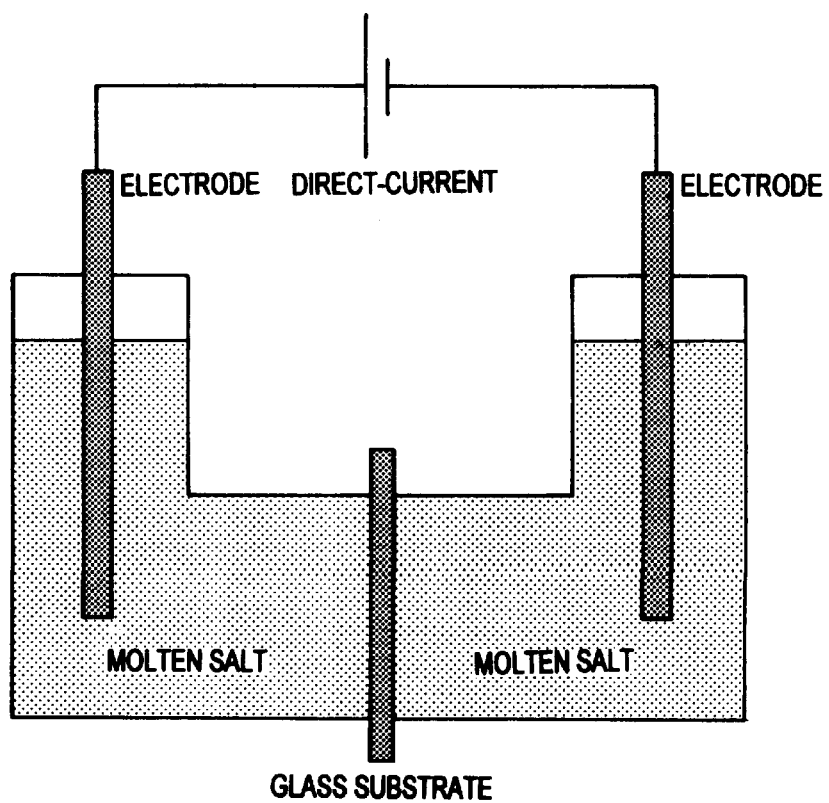
FIG. 3 is a schematic diagram of an apparatus for the second ion exchange.

Thereafter, as shown in FIG. 1(f), the metal film (mask) is removed, and the second ion exchange is carried out on the glass substrate with an ion exchange apparatus shown in FIG. 3. In the ion exchange apparatus, a vessel is filled with molten salt which is a mixture of sodium nitrate and sodium nitrite mixed at 37.5 mol %—62.5 mol %, a positive electrode and a negative electrode are dipped therein, and the ion exchange is carried out for 1 hour while impressing an electric field of 150V/mm across the vessel under a temperature of 260° C.

Figure 4:
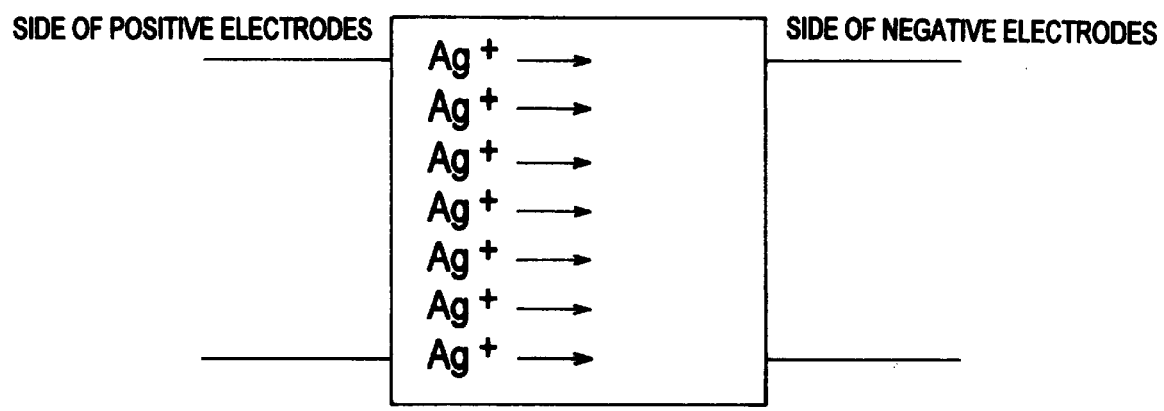
FIG. 4 is a drawing for explaining the ion migration in the second ion exchange.

By carrying out the ion exchange while impressing an electric field, as shown in FIG. 4, although some of the Ag ions are exchanged for Na ions, the majority are diffused into the glass substrate.

Through the above processing, as shown in FIG. 1(h), a portion in which the concentration of Ag ions is dense is formed in the glass substrate, and this portion becomes a highly refractive core in which a light beam is transmitted, and an optical waveguide is obtained. Measuring the diameter of the core, it is found to be about 3 $\mu$m.

Figure 5:
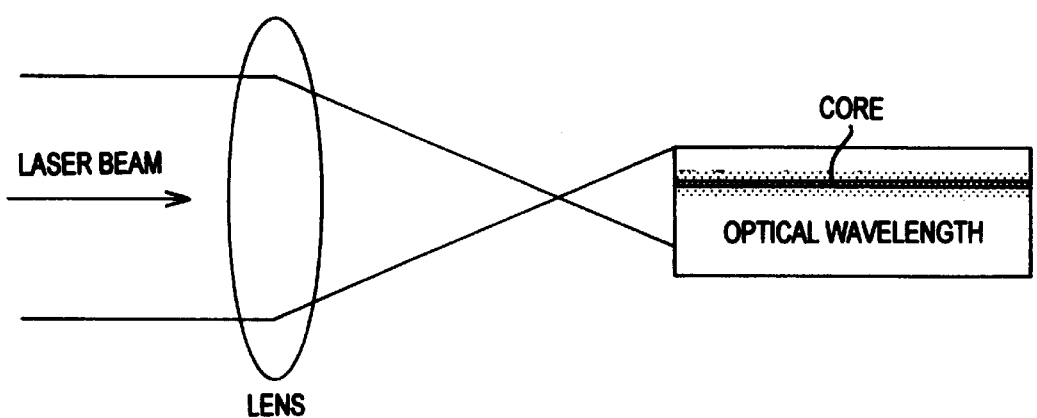
FIG. 5 shows the situation where the laser beam is radiated upon the optical waveguide produced by the method shown in FIG. 1.

Next, as shown in FIG. 5, a laser beam is radiated onto one end surface of the above-described optical waveguide. In the irradiating process, the focus of the laser beam is angled away from the end surface of the optical waveguide and a broader region comprising the core and the periphery thereof is irradiated.

As the laser beam, there is used a third (3) harmonic (wavelength of 355 nm) of an Nd-YAG laser. The pulse width of the laser beam is about 10 nsec, the repetitive frequency is 5 Hz, and the diameter of the laser beam is about 6 mm before being incident upon a focusing lens. To raise the energy density, the laser beam is condensed with the lens (focal length: 100 mm) and is radiated onto the end surface of the optical waveguide. The diameter thereof is about 500 $\mu$m on the end surface of the optical waveguide.

Figure 6:
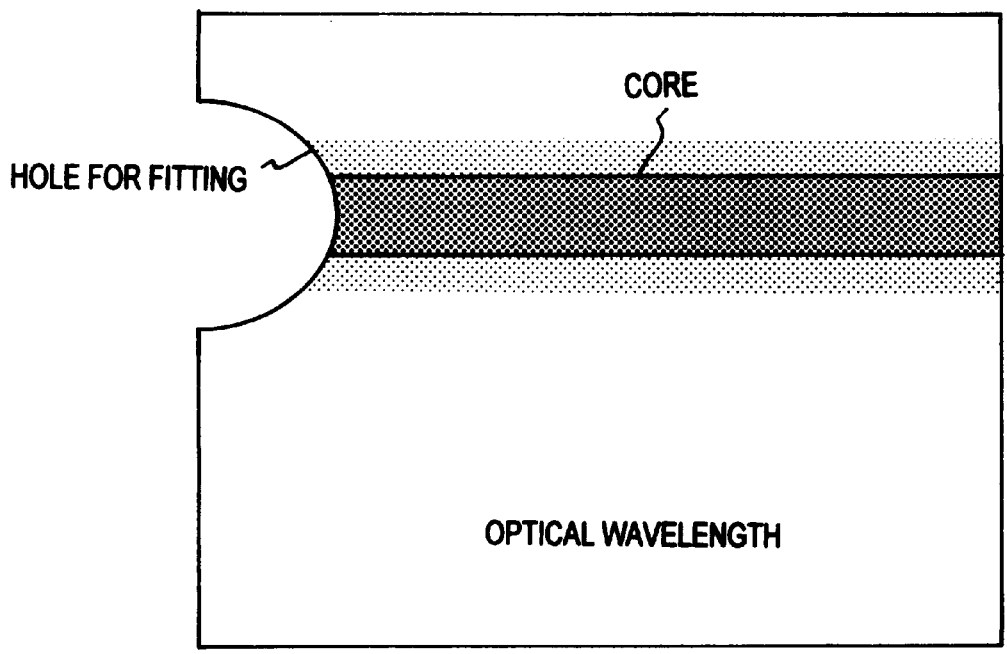
FIG. 6 is an enlarged cross-sectional view of the optical waveguide which is processed by the laser beam; and, FIG. 7 is the same drawing as FIG. 5 according to another embodiment.

In the above optical system, by increasing the energy of the laser beam step by step, ablation will occur at the core portion when the energy of the laser beam comes to be about 30 mJ/pulse, and 5 pulses thereof have been radiated. As a result, as shown in FIG. 6, a hole, the outer diameter of which is about 3 $\mu$m and the depth of which is about 2 $\mu$m, is formed at the core portion of the optical waveguide. As described above, since the core diameter of an optical fiber is a few or several $\mu$m, the core of the optical fiber can easily be fitted into the core of the optical waveguide via this hole.

As is explained above, by the present invention, it is not necessary to precisely match or accord the focus position of the laser beam with the end surface of the glass substrate. Therefore, by approximately adjusting into an arbitrary position, the laser beam can be irradiated onto the region including the core with some measure of leeway. Thereafter, the energy of the laser beam is increased step by step, and the intensity of the laser beam is fixed when the ablation occurs at the core portion.

Figure 7:
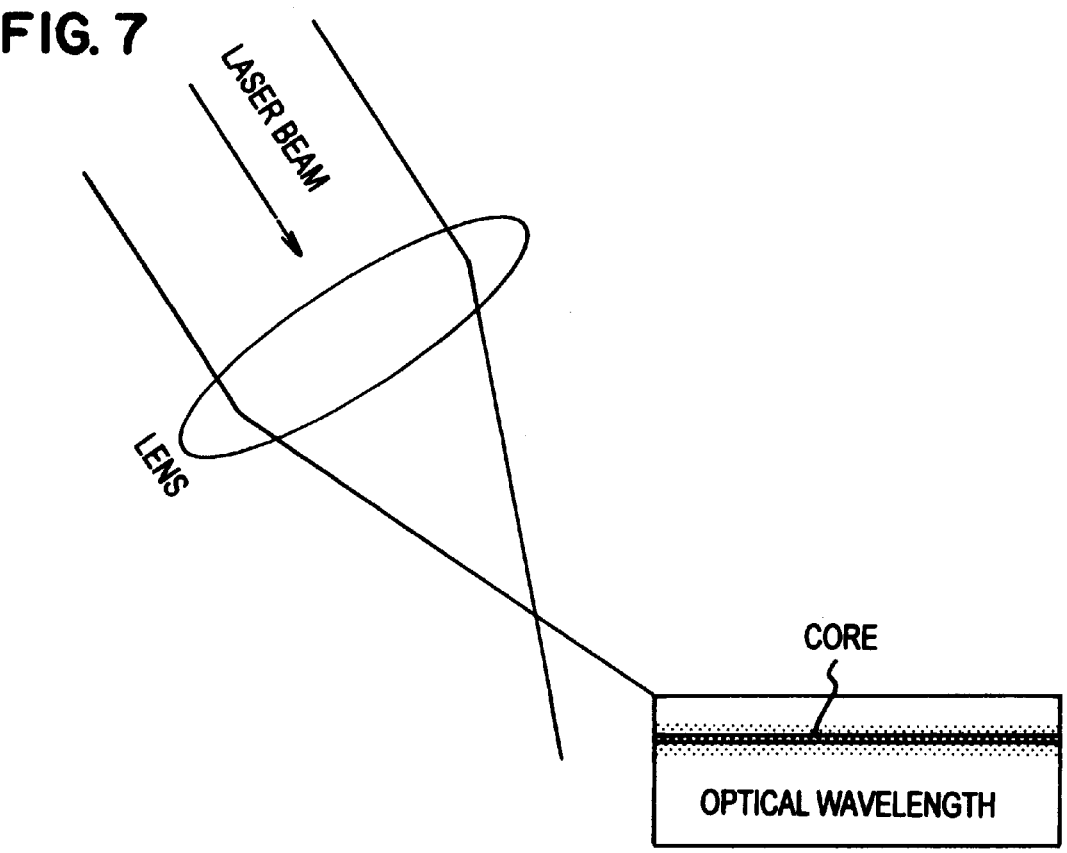

Furthermore, as shown in FIG. 7, the irradiated angle of the laser beam can be oblique with respect to the end surface of the glass substrate.

By radiating the laser beam obliquely, as shown in this embodiment, it is possible to prevent the laser beam entering inside of the core and to avoid damage to the inside of the core. However, in a case where the laser beam is incident from the upper portion of the optical waveguide, since there is the possibility that the core except the end surface may be damaged, it is necessary to take into consideration the irradiating position.

The laser beam is not limited to a third (3) harmonic (wavelength: 355 nm) of an Nd-YAG laser and it is possible to use an excimer laser including an XeF laser, etc., a second (2) harmonic (wavelength: 532 nm) of an Nd:YAG laser, a Ti:Al$_2$O$_3$ laser and a harmonic thereof and a light beam which is converted with respect to the wavelength thereof, or a pigment laser.

Comparison

As an optical waveguide, thallium ions are introduced, and a laser beam is radiated onto the end surface of the optical waveguide in the optical system shown in FIG. 5.

The ablation occurs at the end surface of the optical waveguide when the energy of the laser beam comes to be 80 mJ/pulse, and 5 pulses thereof have been radiated. As a result, not only the core portion thereof but also the cladding portion around it evaporates, and the hole which is formed is unsuitable as a hole for fitting.

As is explained above, by the present invention, in the case of forming a hole for fitting an optical fiber, etc., to the core portion by irradiating a laser beam onto one end surface of the optical waveguide, through making the absorption characteristics of the core with respect to the laser beam superior to the absorption characteristics of the surrounding portions, irradiating the laser beam onto the region including the core with some measure of leeway, furthermore, setting the intensity of the laser beam at a value more than a threshold value that is enough to cause fusion, evaporation or ablation to the core, less than to the surrounding regions, it is possible to form a hole only at the core portion without precisely adjusting the focus of the laser beam with respect to the position of the core, and consequently it is possible to sharply increase productivity in manufacturing.

By introducing silver into the substrate which comprises the optical waveguide by means of the ion exchange, etc., in the form of Ag atoms, Ag colloids or Ag ions, it is possible to increase the refractive index and the absorption characteristics of the core with respect to the laser beam simultaneously.

Furthermore, by increasing the absorption characteristics with respect to the laser beam, it is possible to make use of an excimer laser, an Nd:YAG laser, a Ti:Al$_2$O$_3$ laser and a harmonic thereof and a light beam which is converted with respect to the wavelength thereof, or a pigment laser, which could not be used to process glass hitherto.

What is claimed is:

1. A laser processing method to an optical waveguide, comprising the steps of: forming a highly refractive core in which a light beam is to be transmitted in a substrate; making absorption characteristics of the core with respect to a laser beam superior to absorption characteristics of the substrate in proportion to a refractive index of the core; and radiating the laser beam onto a region, in which the highly refractive core is exposed, including the core at an end surface of the optical waveguide; wherein an intensity of the laser beam is set at a value more than a threshold value that is enough to cause fusion, evaporation or ablation to the core and less than a threshold value that is sufficient to cause fusion, evaporation or ablation to other portions of the region; so that a hole is formed only at a portion of the core exposed in the region.

2. A laser processing method to an optical waveguide as defined in claim 1, wherein an optical axis of said laser beam is oblique with respect to an axis of the core.

3. A laser processing method to an optical waveguide as defined in claim 2, wherein said laser beam is obtained from an excimer laser including an XeF; an Nd:YAG laser; a Ti:$Al_2O_3$ laser and a harmonic thereof and a light beam which is converted with respect to the wavelength thereof; or a pigment laser.

4. A laser processing method to an optical waveguide as defined in claim 1, further comprising increasing the refractive index and the absorption characteristics of the core with respect to the laser beam by introducing silver into the optical waveguide in the form of Ag atoms, Ag colloids or Ag ions.

5. A laser processing method to an optical waveguide as defined in claim 1, wherein said laser beam is obtained from an excimer laser including an XeF; an Nd:YAG laser; a Ti:$Al_2O_3$ laser and a harmonic thereof and a light beam which is converted with respect to the wavelength thereof; or a pigment laser.

* * * * *